UNITED STATES PATENT OFFICE.

IENS PAULI LIHME, OF LAKEWOOD, OHIOM ASSIGNOR TO THE GRASSELLI CHEMICAL COMPANY, OF CLEVELAND, OHIO, A CORPORATION OF OHIO.

MANUFACTURE OF LEAD ARSENATE.

1,267,428.　　Specification of Letters Patent.　Patented May 28, 1918.

No Drawing.　Application filed July 25, 1916.　Serial No. 111,239.

*To all whom it may concern:*

Be it known that I, IENS PAULI LIHME, a citizen of the United States, and a resident of Lakewood, county of Cuyahoga, and State of Ohio, have invented a new and useful Improvement in the Manufacture of Lead Arsenate, of which the following is a specification, the principle of the invention being herein explained and the best mode in which I have contemplated applying that principle, so as to distinguish it from other inventions.

Lead arsenate may be made by directly reacting upon litharge, that is lead oxid of the formula PbO, with arsenic acid ($H_3AsO_4$), such reaction being indicated by the following equation, viz:—

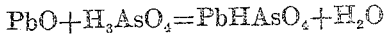

$$PbO + H_3AsO_4 = PbHAsO_4 + H_2O$$

I have discovered, however, that a much superior product is obtained, and the reaction moreover considerably expedited, by adding another ingredient to the two materials just named, such other ingredient consisting of a halogen derivative of silicon, preferably an acid-halogen derivative such as hydro-fluosilicic acid ($H_2SiF_6$). In carrying out the manufacture, then, of lead arsenate in accordance with my present improved method, I utilize the steps hereinafter fully described and particularly pointed out in the claims.

The following description sets forth in detail one approved method of carrying out the invention, such disclosed mode, however, constituting but one of the various ways in which the principle of the invention may be used.

The litharge and arsenic acid are preferably used in the proportions of their combining weights, it being understood that such combining weights are slightly different for the different arsenates, viz., so-called acid arsenate and neutral arsenate, ordinary commercial arsenate of lead usually consisting of a mixture of the two. Preparatory to the reaction the litharge is stirred into water so as to make a rather dilute mixture, then the proper amount of arsenic acid is added, and finally a relatively small amount of the hydrofluosilicic acid, preferably less than one per cent., for example 0.5 per cent., of the amount of arsenic acid used as aforesaid.

The hydrofluosilicic acid presumably reacts with the lead oxid to form a silico-fluorid which is soluble in water, and which in turn reacts with the arsenic acid present in the mixture to form lead arsenate. Incidentally to this last reaction hydrofluosilicic acid is reformed, which in turn acts on more lead oxid.

These reactions, as previously stated, occur rapidly, and the entire mass of lead oxid is promptly converted into the arsenate. The latter, when formed in the fashion described, is a very superior product, in that it is a soft, flaky white precipitate that is readily suspended in water with little tendency to settle, and so admirably suited for use as an insecticide.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. The method of making lead arsenate, which consists in reacting between lead oxid and arsenic acid in the presence of an acid-halogen derivative of silicon.

2. The method of making lead arsenate, which consists in reacting between lead oxid and arsenic acid in the presence of hydrofluosilicic acid, substantially as described.

3. The method of making lead arsenate, which consists in reacting between lead oxid and arsenic acid, used in the proportions of their combining weights, in the presence of hydrofluosilicic acid, the latter being used in an amount less than one per cent. of such arsenic acid.

Signed by me this 24th day of July, 1916.

IENS PAULI LIHME.

Attested by—
　M. H. MILLER,
　W. T. COSHMAN.